US012591374B2

(12) United States Patent
Hu

(10) Patent No.: US 12,591,374 B2
(45) Date of Patent: Mar. 31, 2026

(54) MEMORY MITIGATING SCL AFFECTS DURING POWER-ON

(71) Applicant: Micron Technology, Inc., Boise, ID (US)

(72) Inventor: Tingjun Hu, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/887,686

(22) Filed: Sep. 17, 2024

(65) Prior Publication Data

US 2026/0079630 A1 Mar. 19, 2026

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
USPC ................................................. 711/103, 102
See application file for complete search history.

(56) References Cited

U.S. PATENT DOCUMENTS 11,227,666 B1 * 1/2022 Parthasarathy .. G11C 29/12005

* cited by examiner

Primary Examiner — Hosain T Alam
Assistant Examiner — Zubair Ahmed
(74) *Attorney, Agent, or Firm* — Schwegman Lundberg & Woessner, P.A.

(57) ABSTRACT

This disclosure is directed to a memory system that compensates for slow charge loss (SCL) encountered during a power off period. The memory system computes, during a power-on sequence of the memory device, a first value associated with reading data from an individual portion of the memory device and obtains a second value associated with reading data from the individual portion, the second value having been computed during a power-off sequence of the memory device. The memory system compares the first value with the second value to estimate a measure of SCL encountered while the memory device was powered off and reads the data from a plurality of portions of the memory device based on respective threshold voltages that compensate for the estimated measure of SCL.

20 Claims, 6 Drawing Sheets

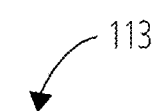
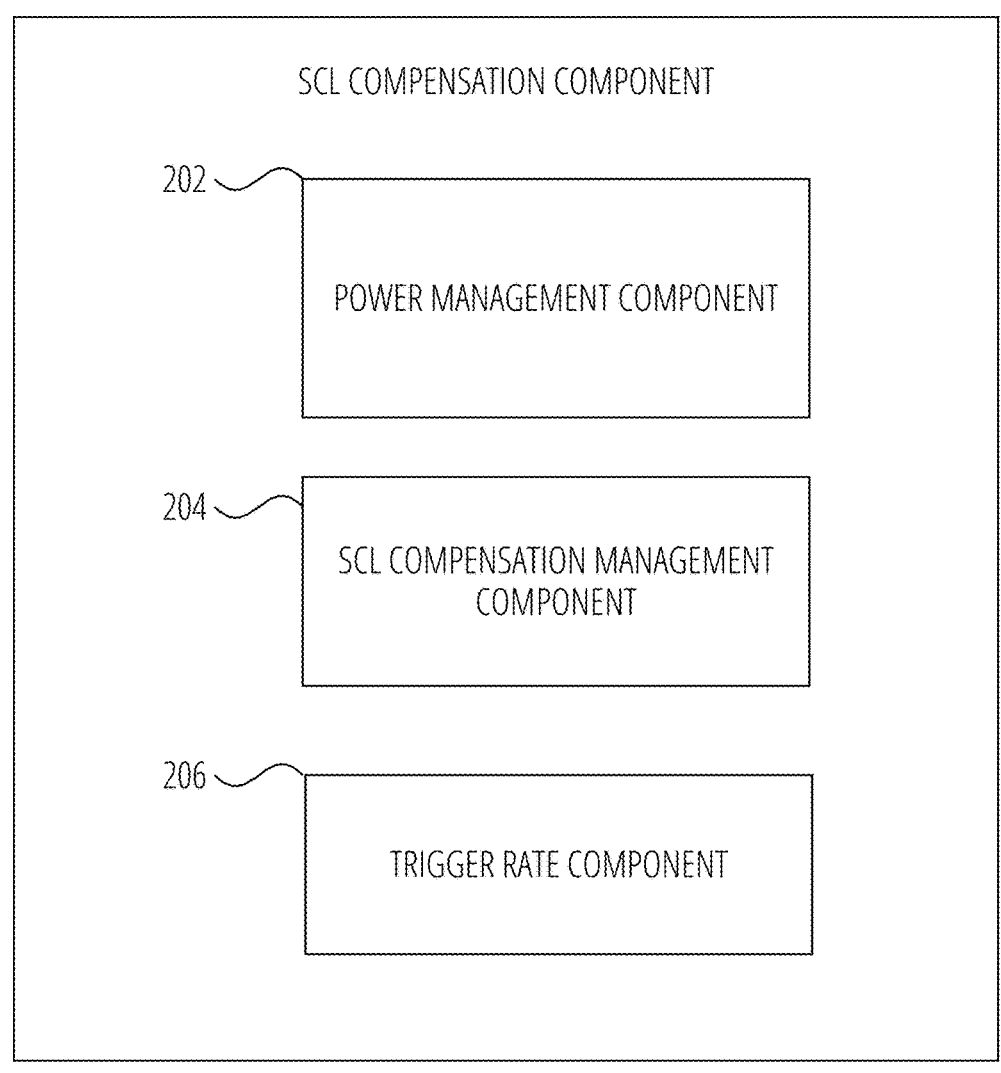
FIG. 2

300

302 — RECEIVE POWER-OFF COMMAND

304 — READ DESIGNATED MEMORY BLOCK AND RECORD READ LEVEL OFFSET FOR SUCCESSFUL HARD DECODE OR CFBIT COUNT

306 — STORE MEMORY BLOCK ADDRESS, BFEA BIN AND READ LEVEL OFFSET OR CFBIT INFORMATION

308 — POWER OFF MEMORY DEVICE

500

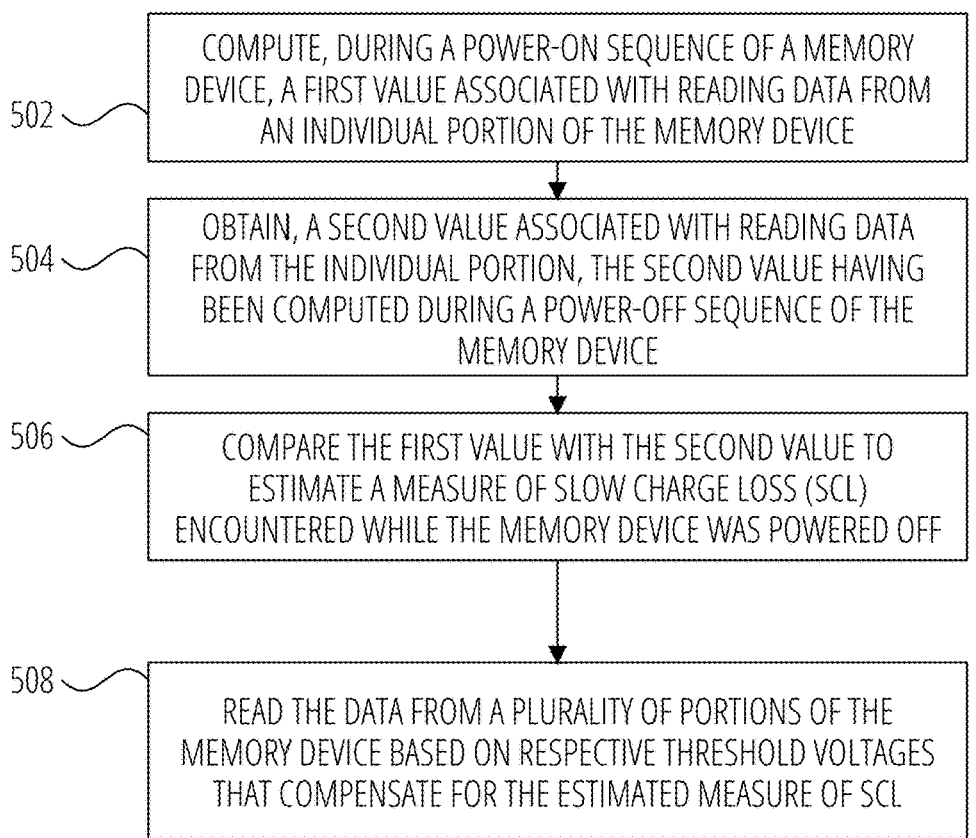

502 —

COMPUTE, DURING A POWER-ON SEQUENCE OF A MEMORY DEVICE, A FIRST VALUE ASSOCIATED WITH READING DATA FROM AN INDIVIDUAL PORTION OF THE MEMORY DEVICE

504 —

OBTAIN, A SECOND VALUE ASSOCIATED WITH READING DATA FROM THE INDIVIDUAL PORTION, THE SECOND VALUE HAVING BEEN COMPUTED DURING A POWER-OFF SEQUENCE OF THE MEMORY DEVICE

506 —

COMPARE THE FIRST VALUE WITH THE SECOND VALUE TO ESTIMATE A MEASURE OF SLOW CHARGE LOSS (SCL) ENCOUNTERED WHILE THE MEMORY DEVICE WAS POWERED OFF

508 —

READ THE DATA FROM A PLURALITY OF PORTIONS OF THE MEMORY DEVICE BASED ON RESPECTIVE THRESHOLD VOLTAGES THAT COMPENSATE FOR THE ESTIMATED MEASURE OF SCL

FIG. 5

MEMORY MITIGATING SCL AFFECTS DURING POWER-ON

TECHNICAL FIELD

Examples of the disclosure relate generally to memory sub-systems and, more specifically, to compensating for slow charge loss (SCL) in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

FIG. 2 is a block diagram of a SCL compensation component, in accordance with some examples.

FIG. 5 is a flow diagram of an example method to perform SCL compensation, in accordance with some examples.

DETAILED DESCRIPTION

Figure 1:
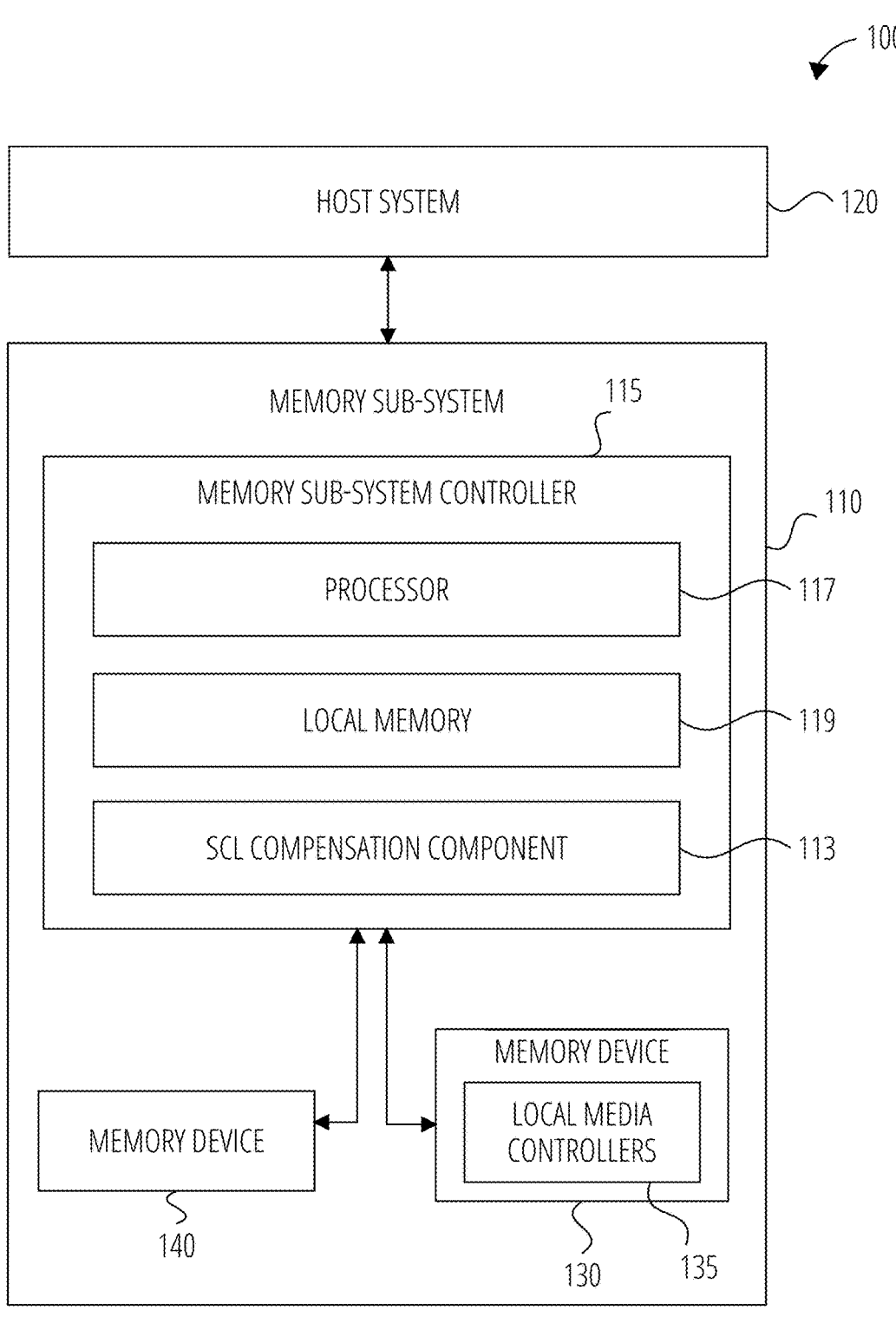
FIG. 1 is a block diagram illustrating an example computing system that includes a memory sub-system, in accordance with some examples.

The present disclosure is directed to a memory sub-system that compensates for SCL encountered during a power off period of the memory sub-system (memory device or memory system). Specifically, the memory sub-system can store (prior to powering down the memory sub-system) a value (e.g., a CFbit count and/or read threshold level offset/adjustment) associated with a particular portion of the memory device (e.g., a last read portion, such as block stripe (BS), or some other designated portion). After receiving a power on command, the memory sub-system can compute a corresponding value for that particular portion (e.g., a new CFbit count and/or new read threshold level offset) to estimate a measure of SCL that was encountered while the memory system was powered off. Using this estimated measure of SCL, the memory sub-system can temporarily (or permanently) apply an SCL compensation (corresponding to the estimated measure of SCL) to the read level threshold voltage used to read data from any portion of the memory sub-system. This can reduce the errors that are encountered when reading data from the memory sub-system after some period of being powered off, which can significantly improve the overall operations of the memory sub-system, such as by reducing read times.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command, erase command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection (GC) management operations. The data that is re-written, for example as initiated by the firmware, is hereinafter referred to as "GC data."

Examples of system data include, but are not limited to, system tables (e.g., logical-to-physical memory address mapping table, also referred to herein as a logical-to-physical (L2P) mapping table (referred to as an L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred to as word lines (WLs)), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

The prolonged storage of solid-state drives (SSDs) on shelves can lead to significant inefficiencies and waste of resources due to a phenomenon known as SCL. This issue becomes particularly problematic when the drive remains inactive for extended periods. During this time, the NAND flash memory cells gradually lose their electrical charge, a process that cannot be addressed while the drive is powered off. Consequently, when the memory controller attempts to read the data upon powering up the SSD, the memory controller encounters an unusually high number of error bits. This situation can necessitate extensive error handling operations, which consume substantial computational resources and time.

The increased error rate and subsequent intensive error correction processes prevent the SSD from meeting desired boot-up time requirements, leading to delays in system initialization and reduced overall performance. This inefficiency not only impacts the immediate usability of the SSD but also potentially affects its long-term reliability and lifespan. The resources wasted in this scenario include the time and energy expended on excessive error correction, the potential loss of data integrity, and the diminished user experience due to extended boot times. Furthermore, this issue highlights a significant challenge in maintaining the readiness and reliability of SSDs in scenarios where long-term storage is necessary, such as in inventory management or disaster recovery planning.

The disclosed techniques address these challenges by providing a memory controller that compensates for SCL encountered during a power off period of the memory sub-system (memory device or memory system). Specifically, the memory controller can store (prior to powering down the memory sub-system) a value (e.g., a CFbit count and/or read threshold level offset/adjustment) associated with a particular portion of the memory device (e.g., a last read portion, such as BS, or some other designated portion). After receiving a power on command, the memory controller can compute a corresponding value for that particular portion (e.g., a new CFbit count and/or new read threshold level offset) to estimate a measure of SCL that was encountered while the memory system was powered off. Using this estimated measure of SCL, the memory controller can temporarily (or permanently) apply an SCL compensation (corresponding to the estimated measure of SCL) to the read level threshold voltage used to read data from any portion of the memory sub-system. This can reduce the errors that are encountered when reading data from the memory sub-system after some period of being powered off, which can significantly improve the overall operations of the memory sub-system, such as by reducing read times.

In some examples, the techniques described herein relate to a system having a processing device, operatively coupled to a memory device. The processing device computes, during a power-on sequence of the memory device, a first value associated with reading data from an individual portion of the memory device and obtains a second value associated with reading data from the individual portion, the second value having been computed during a power-off sequence of the memory device. The processing device compares the first value with the second value to estimate a measure of SCL encountered while the memory device was powered off and reads the data from a plurality of portions of the memory device based on respective threshold voltages that compensate for the estimated measure of SCL. In some cases, the first value includes a first voltage read offset level and the second value includes a second voltage read offset level.

The power-on sequence can be performed at a later time than the power-off sequence and the individual portion can include multiple memory dies of the memory device. In some cases, the processing device computes the second value in response to receiving a command to power off the memory device and stores the computed second value in non-volatile memory in response to receiving the command to power off the memory device in association with data that identifies the individual portion and a block family error avoidance bin of the individual portion. The processing device identifies, as the individual portion, a last written BS that was read from the memory device prior to receiving the command to power off the memory device. The processing device can identify, as the individual portion, a specified BS that represents a plurality of memory blocks.

In some examples, the processing device, in response to receiving the command to power off the memory device, obtains a hard decode pass read level associated with reading data from the individual portion of the memory device, wherein the hard decode pass read level is stored as the computed second value. The processing device receives a command to power on the memory device. The processing device, in response to receiving the command to power on the memory device, computes a new hard decode pass read level associated with reading data from the individual portion and measures a read offset shift between the new hard decode pass read level associated with reading data from the individual portion and the hard decode pass read level that was stored as the computed second value. The processing device can sample mandatory WLs to compute the new hard decode pass read level.

The processing device can search an SCL measurement table based on the read offset shift to estimate the measure of SCL, the SCL measurement table associating different block family error avoidance (BFEA) bins and respective read offset shift values with respective SCL measurements. The processing device can compare the estimated measure of SCL with a threshold value and, in response to determining that the estimated measure of SCL transgresses the threshold value, can apply an SCL compensation value to the respective threshold voltages used to read data from the plurality of portions of the memory device. The processing device can determine a first threshold voltage for reading data from one of the plurality of portions based on one or more of a block family error avoidance bin associated with the one of the plurality of portions, a word line group of the one of the plurality of portions, and a corrective read result associated with the one of the plurality of portions; and adjust the first threshold voltage by the SCL compensation value.

The processing device can store a SCL compensation table that associates different estimated measures of SCL with different compensation values. The SCL compensation table can be generated based on a memory device type of the memory device. The processing device can retrieve the SCL compensation by searching the SCL compensation table based on the estimated measure of SCL. The data can be read from the plurality of portions of the memory device based on respective threshold voltages that compensate for the estimated measure of SCL until a specified condition is satisfied. The processing device can compute a trigger rate representing how frequently error handling is applied to one or more codewords (CW) read from the memory device. The processing device can compare the trigger rate to a threshold trigger rate to determine whether the specified condition is satisfied and, in response to determining that the trigger rate transgresses the threshold trigger rate, can read the data from the plurality of portions of the memory device based on the respective threshold voltages without compensating for the estimated measure of SCL.

In some examples, (in addition to comparing threshold voltages or as an alternative to comparing threshold voltages as a way to estimate the SCL measurement) the processing device can use, as the first value, a first CFbit count value and, as the second value, a second CFbit count value. Each of the first and second CFbit count values representing a count of a total quantity of '1's that are stored or represented by an individual read level. The processing device can receive a command to power on the memory device and, in response to receiving the command to power on the memory device, can compute the second CFbit count value associated with the individual portion. The processing device can measure a read offset shift between the first CFbit count value and the second CFbit count value. The processing device can search an SCL measurement table based on the read offset shift to estimate the measure of SCL and, in response to determining that the estimated measure of SCL transgresses the threshold value, can apply an SCL compensation value to the respective threshold voltages used to read data from the plurality of portions of the memory device.

In some cases, the memory device includes a three-dimensional (3D) NAND device.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing system 100 that includes a memory sub-system 110, in accordance with some examples. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some examples, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, single level cells (SLCs), can store one bit per cell. Other types of memory cells, such as multi-level cells (MLCs), tri-level cells (TLCs), quad-level cells (QLCs), and penta-level cells (PLCs), can store multiple bits per cell. In some examples, each of the memory devices 130, 140 can include one or more arrays of memory cells such as SLCs, MLCs, TLCs, QLCs, or any combination of such. In some examples, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks or BSs. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data (e.g., performing GC operations) at the memory devices 130, 140 and other such operations. The memory sub-system controller 115 can include hardware such as one or more integrated circuits and/or discrete components, a buffer memory, or a combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some examples, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another example, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, GC operations, error detection and ECC operations, encryption operations, caching operations, and address translations between a logical address (e.g., LBA, namespace) and a physical memory address (e.g., physical block address in a physical address space of the memory device 130 or memory device 140) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some examples, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some examples, a memory device 130 is a managed memory device, which is a raw memory device combined with a local controller (e.g., local media controller 135) for media management within the same memory device package. An example of a managed memory device is a managed NAND (MNAND) device. Any operation discussed as being performed by the memory sub-system controller 115 can be similarly performed by the local media controllers 135 and vice versa.

The memory sub-system controller 115 includes a SCL compensation component 113 that enables or facilitates the memory sub-system controller 115 to dynamically perform various operations, such as selectively, temporarily, or permanently applying SCL compensation. Specifically, the SCL compensation component 113 can compute, during a power-on sequence of the memory device, a first value (e.g., threshold voltage, threshold voltage offset, and/or CFbit count) associated with reading data from an individual portion of the memory device and obtains a second value (e.g., threshold voltage, threshold voltage offset, and/or CFbit count) associated with reading data from the individual portion, the second value having been computed during a power-off sequence of the memory device. The SCL compensation component 113 can compare the first value with the second value to estimate a measure of SCL encountered while the memory device was powered off and reads the data from a plurality of portions of the memory device based on respective threshold voltages that compensate for the estimated measure of SCL.

Any discussion with respect to the memory device 130 can similarly be applied to the memory device 140.

FIG. 2 is a block diagram of a SCL compensation component 113, in accordance with some examples. The SCL compensation component 113 can include a power management component 202, a SCL compensation management component 204, and/or a trigger rate component 206. The power management component 202 can receive a request from a host system 120 to power the memory sub-system 110 on or power the memory sub-system 110 off.

In some cases, the power management component 202 includes circuitry that detects whether the memory sub-system 110 is being powered off or on. For example, the power management component 202 can monitor voltage being applied to the power input of the memory sub-system 110. If the power management component 202 determines that the voltage being applied falls below a threshold and remains low for a threshold period of time, the power management component 202 can initiate a power off sequence. During the power off sequence, the power management component 202 can store various configuration information in non-volatile storage, flush a cache or DRAM to non-volatile storage, and perform other operations.

In some examples, the power management component 202, as part of the power off sequence, can store information that is later used to compute or determine or estimate a measure of SCL encountered while the memory sub-system 110 was powered off. To do so, the power management component 202 can select a particular memory portion of the memory device 130. In some cases, the particular memory portion that is selected includes a designated BS that is know to accurately represent SCL across multiple various portions of the memory device 130. In some cases, the particular memory portion that is selected includes a last read BS (e.g., corresponding to a memory block address that was last used to retrieve data from the memory device 130). In some cases, the power management component 202 selects multiple memory portions and performs the below operations to apply selective SCL compensation following power up of the memory sub-system 110 based on the multiple memory portions (e.g., based on an average of the SCL compensation that is determined for each of the selected memory portions).

After selecting the particular memory portion (or the multiple memory portions that are selected), the power management component 202 can obtain various information for the particular memory portion(s). For example, the power management component 202 can obtain the threshold voltage offset that was applied to successfully read data from the particular memory portion(s). This threshold voltage offset can correspond to a hard decode pass read level. The power management component 202 can also determine the BFEA bin associated with the particular memory portion(s). The power management component 202 can then store an indication of the physical address of the particular memory portion(s), the threshold voltage (e.g., corresponding to a hard decode pass read level) or voltage offset, and/or the BFEA bin of the particular memory portion(s).

In some cases, power management component 202 can compute a CFbit count value for one or more levels associated with the particular memory portion(s). The power management component 202 can also determine the BFEA bin associated with the particular memory portion(s). The power management component 202 can then store an indication of the physical address of the particular memory portion(s), the CFbit count value, and/or the BFEA bin of the particular memory portion(s).

In some examples, the power management component 202 detects a power on command, such as based on detecting a supply voltage being applied after a threshold period of time has elapsed since the memory sub-system 110 was powered off. In such cases, the power management component 202 can initiate a power on sequence. The power on sequence can include a firmware retrieving a configuration file and preparing the memory sub-system 110 to read/write data to the memory device 130. As part of the power on sequence, the power management component 202 retrieves the information previously stored for the particular memory portion(s) from non-volatile storage. The power management component 202 can communicate or provide that information to the SCL compensation management component 204. For example, the power management component 202 can retrieve any of the following information including the indication of the physical address of the particular memory portion(s) (selected, prior to powering down the memory sub-system 110, to based SCL compensation), threshold voltage last applied to read data from the particular memory portion(s), the CFbit count value, and/or the BFEA bin of the particular memory portion(s).

In some examples, the SCL compensation management component 204 can compute or determine a new threshold voltage for reading data successfully from the particular memory portion(s). For example, the SCL compensation management component 204 can attempt to read data from the particular memory portion(s) and perform various decoding operations to determine the hard decode pass read level for successfully reading data from the particular portion(s). In some cases, the SCL compensation management component 204 can attempt to read data by sampling mandatory WLs of the particular memory portion(s) to compute the hard decode pass level. The SCL compensation management component 204 can then compare the new threshold voltage (or offset) with the threshold voltage or offset retrieved from the non-volatile memory (corresponding to the threshold voltage or offset that was last used to read data from the particular memory portion(s) prior to determining that the memory sub-system 110 is being powered off). The SCL compensation management component 204 can measure a read offset shift between the two voltage threshold (or offset) values.

In some cases, the SCL compensation management component 204 can compute or determine a new CFbit count value for one or more read levels of the particular memory portion(s). The new CFbit count value can be determined or computed for the same levels of the particular memory portion(s) as that which was used to obtain the CFbit count value during the power off sequence of the memory sub-system 110. In some cases, the SCL compensation management component 204 can compute the new CFbit count value by sampling the one or more read levels from mandatory WLs of the particular memory portion(s). The SCL compensation management component 204 can then compare the new CFbit count value with the CFbit count value retrieved from the non-volatile memory (corresponding to the CFbit count value that was computed for the same one or more levels of the particular memory portion(s) prior to determining that the memory sub-system 110 is being powered off). The SCL compensation management component 204 can measure a read offset shift between the two CFbit count values.

The SCL compensation management component 204 can maintain an SCL measurement table. The SCL measurement table can associate different read offset shift values with corresponding estimated measures of SCL. In some cases, the SCL measurement table can further associate different read offset shift values with different BFEA bins. The SCL compensation management component 204 can obtain the BFEA bin currently associated with the particular memory portion(s). The SCL compensation management component 204 can then search the SCL measurement table based on the currently assigned BFEA bin and the measured read offset shift (e.g., computed based on the threshold voltage difference in values and/or difference in CFbit count values). The SCL compensation management component 204 can retrieve the estimated measure of SCL from the SCL measurement table that is associated with the currently assigned BFEA bin and the measured read offset shift.

In some examples, the SCL compensation management component 204 can apply an SCL compensation amount to the threshold voltage used to read data from any or a set of portions of the memory device 130 based on the estimated measure of SCL. For example, the SCL compensation management component 204 can compare the estimated measure of SCL to a threshold. In response to determining that the estimated measure of SCL transgresses the threshold, the SCL compensation management component 204 applies the SCL compensation (retrieved from an SCL compensation table) to the threshold voltage being used to read data from the portions of the memory device 130. In response to determining that the estimated measure of SCL fails to transgress the threshold, the SCL compensation management component 204 does not apply the SCL compensation (retrieved from an SCL compensation table) to the threshold voltage being used to read data from the portions of the memory device 130.

The SCL compensation management component 204 can maintain the SCL compensation table. The SCL compensation table can associate different SCL compensation values (e.g., different voltage compensation/adjustment values) with corresponding estimated measures of SCL. In some cases, the SCL compensation table can further associate different SCL compensation values with different BFEA bins. The SCL compensation management component 204 can obtain the BFEA bin currently associated with the particular memory portion(s). The SCL compensation management component 204 can then search the SCL measurement table based on the currently assigned BFEA bin and the estimated measure of SCL. The SCL compensation management component 204 can retrieve the SCL compensation value from the SCL compensation table that is associated with the currently assigned BFEA bin and the measured read offset shit. In some cases, the SCL compensation management component 204 can then apply the SCL compensation to a threshold voltage being used to read data from any or a set of portions of the memory device 130. For example, the SCL compensation management component 204 can determine a first threshold voltage for reading data from one of the plurality of portions of the memory device 130 based on one or more of a BFEA bin associated with the one of the plurality of portions, a WL group of the one of the plurality of portions, and/or a corrective read result associated with the one of the plurality of portions. The SCL compensation management component 204 can then adjust the first threshold voltage by the SCL adjustment (compensation) value.

The SCL compensation management component 204 can, in some cases, determine which memory blocks are on a list of previously programmed memory blocks that includes memory blocks that were programmed with data before the power on command was received. The SCL compensation management component 204 can apply the SCL compensation to the threshold voltage used to read data from any of the memory blocks that are on the list of previously programmed memory blocks. Any memory block that is programmed with new data subsequent to receiving the power on command may be read using a threshold voltage that is computed without applying the SCL compensation. The SCL compensation management component 204 can remove memory blocks from the list of previously programmed memory blocks as GC operations are performed on those memory blocks and data is moved to newly programmed memory blocks.

In some examples, the SCL compensation management component 204 can only temporarily apply the SCL adjustment value to the threshold voltage being used to read data from portions of the memory device 130. For example, the SCL compensation management component 204 can communicate with the trigger rate component 206 to detect a condition for terminating or stopping application of the SCL adjustment value. In some cases, the trigger rate component 206 can monitor the trigger rate associated with reading data from CWs of memory blocks stored on the memory device 130. The trigger rate refers to the frequency at which read operations trigger error correction processes. Specifically, it can be the threshold at which the number of bit errors in a read operation necessitates the use of more advanced error correction techniques or triggers a read retry operation. When the number of errors in a read operation exceeds this predefined trigger rate, it signals that the data integrity may be compromised, requiring additional error handling procedures.

In some cases, the trigger rate can be computed as a ratio of a number of times error handling operations are triggered for CWs to a total number of CWs that have been read. The trigger rate component 206 can determine whether the trigger rate transgresses a threshold trigger rate. In response to determining that the trigger rate fails to transgress the threshold trigger rate, the trigger rate component 206 continues to allow the SCL compensation management component 204 to apply the SCL adjustment value to the read threshold voltages being used to read data. In response to determining that the trigger rate transgresses the threshold trigger rate, the trigger rate component 206 instructs the SCL compensation management component 204 to discontinue application of the SCL adjustment value to the read threshold voltages being used to read data.

Figure 3:
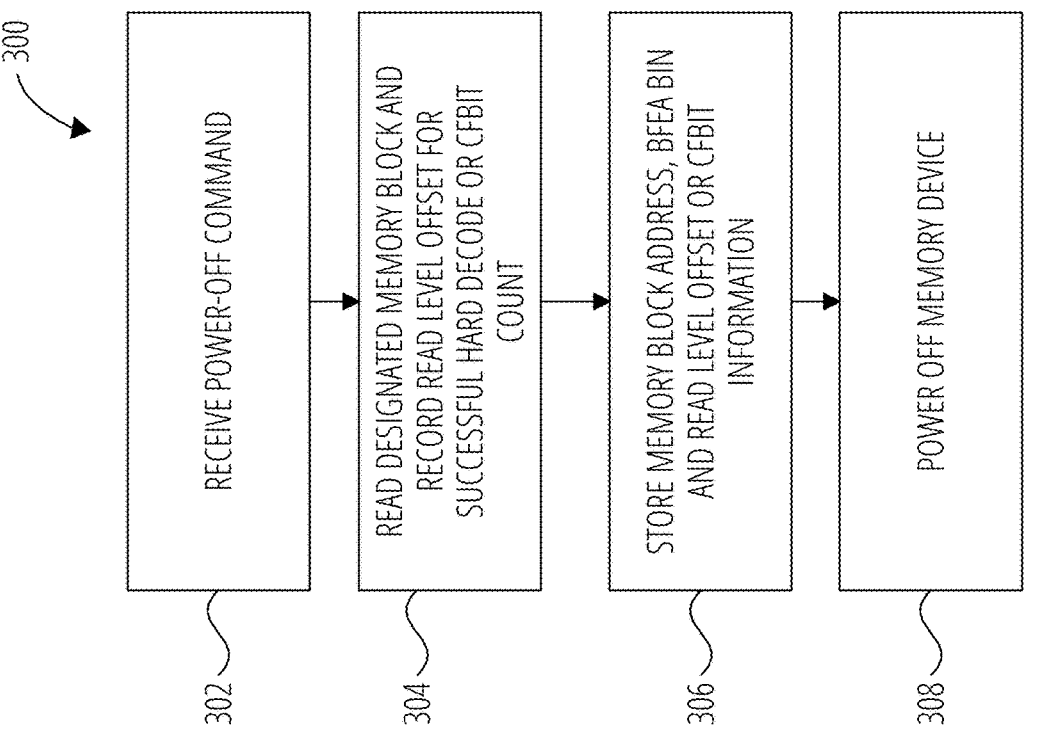
FIG. 3 illustrates a diagram of operations performed using the SCL compensation component, in accordance with some examples.

FIG. 3 illustrates a diagram 300 of operations performed using the SCL compensation component 113, in accordance with some examples. The SCL compensation component 113 can receive a power off command at operation 302. In response, the SCL compensation component 113 reads a designated memory block and records the read level offset used to successfully perform a hard decode operation or can compute a CFbit count value for one or more levels of the designated memory block at operation 304. The SCL compensation component 113 can then store the memory block address, BFEA bin and the read level offset, and/or CFBit information in non-volatile memory at operation 306 before powering off the memory sub-system 110 at operation 308.

Figure 4:
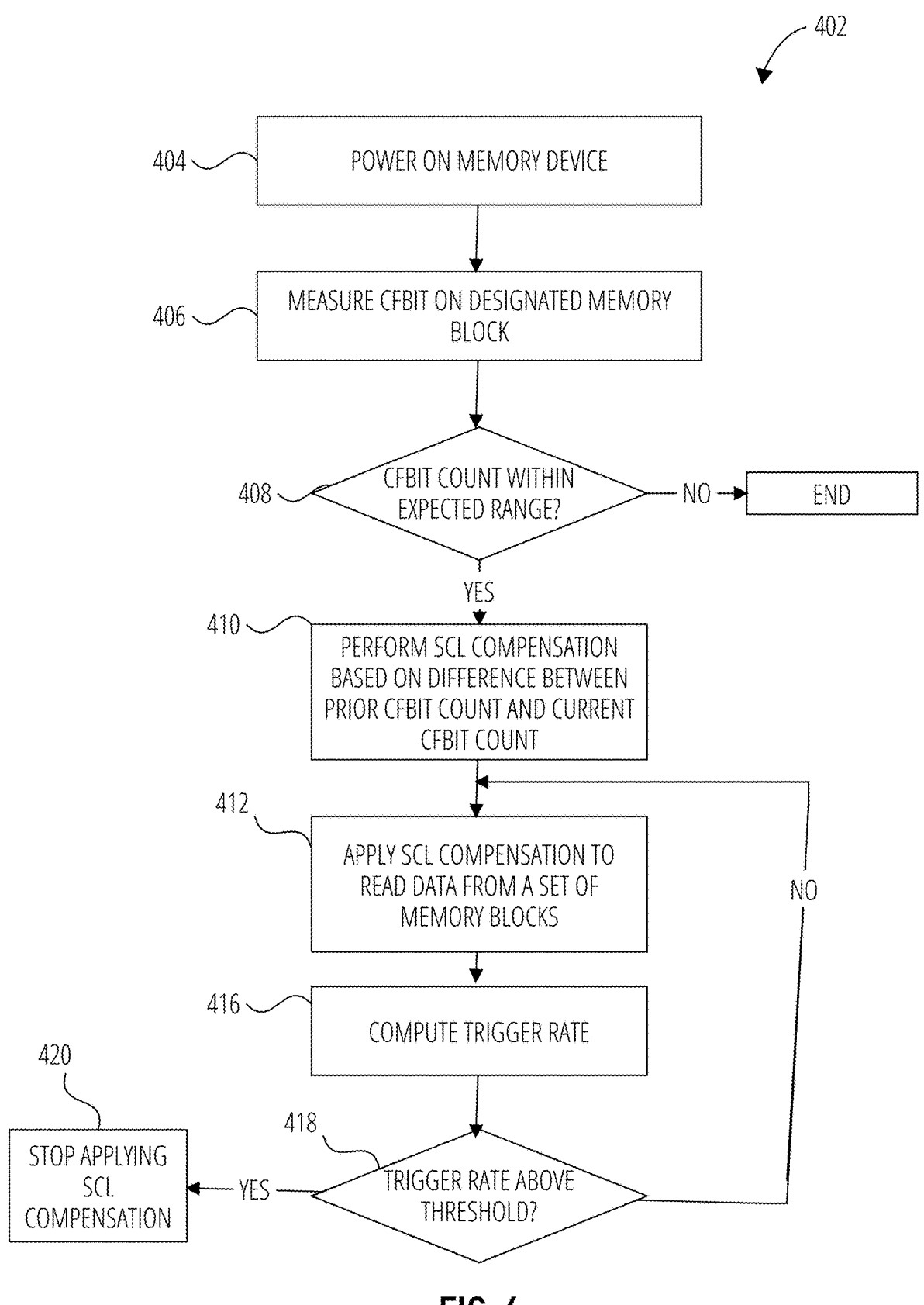
FIG. 4 illustrates a diagram of operations performed using the SCL compensation component, in accordance with some examples.

FIG. 4 illustrates a diagram 402 of operations performed using the SCL compensation component 113, in accordance with some examples. At operation 404, the SCL compensation component 113 receives a command to power on the memory device 130 and/or detects that the memory device 130 is being powered on. In response, the SCL compensation component 113, at operation 406, measures the CFbit on the designated memory block (used to store the information in the process of diagram 300). If the SCL compensation component 113 determines at operation 408 that the CFbit count is within an expected range, the SCL compensation component 113 performs operation 410; otherwise, the process ends.

At operation 410, the SCL compensation component 113 performs SCL compensation based on a difference between the prior CFbit count of the designated memory block (prior to powering off the memory sub-system 110) and a current CFbit count. This difference is used at operation 412 to apply SCL compensation to threshold voltages used to read data from various memory blocks of the memory device 130. The SCL compensation component 113 can compute a trigger rate associated with performing error corrections on data read from the memory device 130 at operation 416. If the SCL compensation component 113 determines that the trigger rate fails to exceed a threshold at operation 418, the SCL compensation component 113 performs operation 412. Otherwise, the SCL compensation component 113 performs operation 420 where SCL compensation stops being applied to the threshold voltage being used to read data from the memory device 130.

FIG. 5 is a flow diagram of an example method 500 (or process) to perform operations, in accordance with some examples. Method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the memory sub-system controller 115 or subcomponents of the memory sub-system controller 115 of FIG. 1. In these examples, the method 500 can be performed, at least in part, by the SCL compensation component 113. Although the processes are shown in a particular sequence or order, unless otherwise specified, the order of the processes can be modified. Thus, the illustrated examples should be understood only as examples; the illustrated processes can be performed in a different order, and some processes can be performed in parallel. Additionally, one or more processes can be omitted in various examples. Thus, not all processes are required in every example. Other process flows are possible.

Referring now to FIG. 5, the method 500 begins at operation 502, with the SCL compensation component 113 of a memory sub-system 110 (e.g., memory device 140 or memory device 130) computing, during a power-on sequence of a memory device, a first value associated with reading data from an individual portion of the memory device 130. Then, at operation 504, the SCL compensation component 113 obtains a second value associated with reading data from the individual portion, the second value having been computed during a power-off sequence of the memory device 130. The SCL compensation component 113 compares the first value with the second value to estimate a measure of SCL encountered while the memory device 130 was powered off at operation 506 and, at operation 508, the SCL compensation component 113 reads the data from a plurality of portions of the memory device 130 based on respective threshold voltages that compensate for the estimated measure of SCL.

Figure 6:
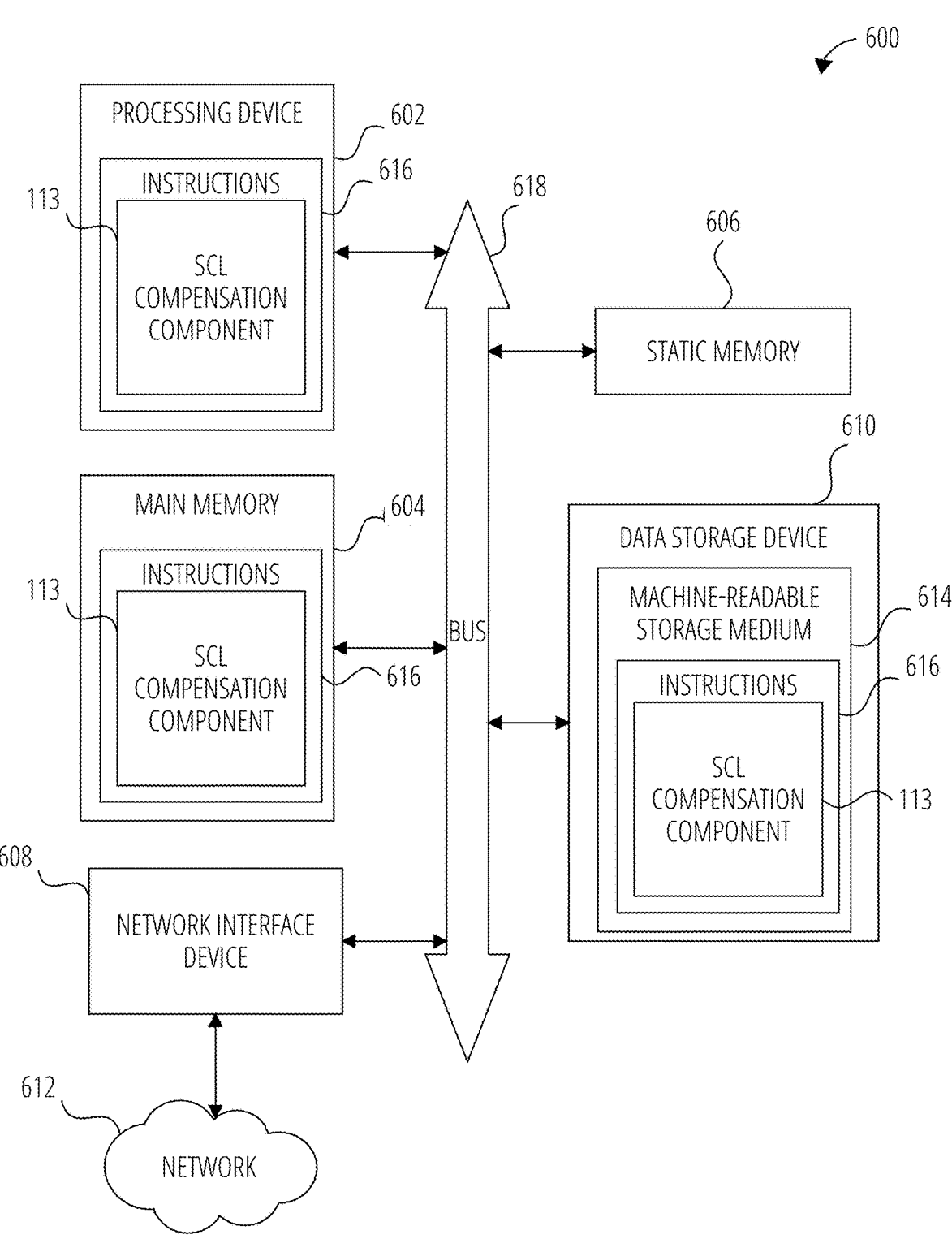
FIG. 6 is a block diagram of an example computer system, according to some examples.

FIG. 6 illustrates an example machine in the form of a computer system 600 within which a set of instructions can be executed for causing the machine to perform any one or more of the methodologies discussed herein. In some examples, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage device 610, which communicate with each other via a bus 618.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application-specific integrated circuit (ASIC), a field programmable gate array (FPGA), a digital signal processor (DSP), a network processor, or the like. The processing device 602 is configured to execute instructions 616 for performing the operations and steps discussed herein. The computer system 600 can further include a network interface device 608 to communicate over a network 612.

The data storage device 610 can include a machine-readable storage medium 614 (also known as a computer-readable medium) on which is stored one or more sets of instructions 616 or software embodying any one or more of the methodologies or functions described herein. The instructions 616 can also reside, completely or at least partially, within the main memory 604 and/or within the processing device 602 during execution thereof by the computer system 600, the main memory 604 and the processing device 602 also constituting machine-readable storage media. The machine-readable storage medium 614, data storage device 610, and/or main memory 604 can correspond to the memory sub-system 110 of FIG. 1.

In one example, the instructions 616 include instructions to implement functionality corresponding to providing block failure protection for a zone memory sub-system as described herein (e.g., the SCL compensation component 113 of FIG. 1). While the machine-readable storage medium 614 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1. A system comprising: a memory device; and a processing device, operatively coupled to the memory device, configured to perform operations comprising: computing, during a power-on sequence of the memory device, a first value associated with reading data from an individual portion of the memory device; obtaining a second value associated with reading data from the individual portion, the second value having been computed during a power-off sequence of the memory device; comparing the first value with the second value to estimate a measure of slow charge loss (SCL) encountered while the memory device was powered off; and reading the data from a plurality of portions of the memory device based on respective threshold voltages that compensate for the estimated measure of SCL.

Example 2. The system of Example 1, wherein the first value comprises a first voltage read offset level, and wherein the second value comprises a second voltage read offset level.

Example 3. The system of Example 2, wherein the power-on sequence is performed at a later time than the power-off sequence, wherein the individual portion comprises multiple memory dies of the memory device.

Example 4. The system of Example 3, the operations comprising: computing the second value in response to receiving a command to power off the memory device; and storing the computed second value in non-volatile memory in response to receiving the command to power off the memory device in association with data that identifies the individual portion and a block family error avoidance bin of the individual portion.

Example 5. The system of Example 4, the operations comprising: identifying, as the individual portion, a last written BS that was read from the memory device prior to receiving the command to power off the memory device.

Example 6. The system of any one of Examples 4-5, the operations comprising: identifying, as the individual portion, a specified BS that represents a plurality of memory blocks.

Example 7. The system of any one of Examples 4-6, the operations comprising: in response to receiving the command to power off the memory device, obtaining a hard decode pass read level associated with reading data from the individual portion of the memory device, wherein the hard decode pass read level is stored as the computed second value.

Example 8. The system of Example 7, the operations comprising: receiving a command to power on the memory device; in response to receiving the command to power on the memory device, computing a new hard decode pass read level associated with reading data from the individual portion; and measuring a read offset shift between the new hard decode pass read level associated with reading data from the individual portion and the hard decode pass read level that was stored as the computed second value.

Example 9. The system of Example 8, the operations comprising: sampling mandatory word lines to compute the new hard decode pass read level.

Example 10. The system of any one of Examples 8-9, operations comprising: searching an SCL measurement table based on the read offset shift to estimate the measure of SCL, the SCL measurement table associating different block family error avoidance bins and respective read offset shift values with respective SCL measurements.

Example 11. The system of Example 10, the operations comprising: comparing the estimated measure of SCL with a threshold value; and in response to determining that the estimated measure of SCL transgresses the threshold value, applying an SCL compensation value to the respective threshold voltages used to read data from the plurality of portions of the memory device.

Example 12. The system of Example 11, the operations comprising: determining a first threshold voltage for reading data from one of the plurality of portions based on one or more of a block family error avoidance bin associated with the one of the plurality of portions, a word line group of the one of the plurality of portions, and a corrective read result associated with the one of the plurality of portions; and adjusting the first threshold voltage by the SCL compensation value.

Example 13. The system of any one of Examples 11-12, the operations comprising: storing a SCL compensation table that associates different estimated measures of SCL with different compensation values, the SCL compensation table being generated based on a memory device type of the memory device; and retrieving the SCL compensation by searching the SCL compensation table based on the estimated measure of SCL.

Example 14. The system of any one of Examples 1-13, wherein the data is read from the plurality of portions of the memory device based on respective threshold voltages that compensate for the estimated measure of SCL until a specified condition is satisfied.

Example 15. The system of Example 14, the operations comprising: computing a trigger rate representing how frequently error handling is applied to one or more codewords (CW) read from the memory device; comparing the trigger rate to a threshold trigger rate to determine whether the specified condition is satisfied; and in response to determining that the trigger rate transgresses the threshold trigger rate, reading the data from the plurality of portions of the memory device based on the respective threshold voltages without compensating for the estimated measure of SCL.

Example 16. The system of any one of Examples 1-15, wherein the first value comprises a first CFbit count value, and wherein the second value comprises a second CFbit count value, each of the first and second CFbit count values representing a count of a total quantity of '1's that are stored or represented by an individual read level.

Example 17. The system of Example 16, the operations comprising: receiving a command to power on the memory device; in response to receiving the command to power on the memory device, computing the second CFbit count value associated with the individual portion; measuring a read offset shift between the first CFbit count value and the second CFbit count value; searching an SCL measurement table based on the read offset shift to estimate the measure of SCL; and in response to determining that the estimated measure of SCL transgresses the threshold value, applying an SCL compensation value to the respective threshold voltages used to read data from the plurality of portions of the memory device.

Example 18. The system of any one of Examples 1-17, wherein the memory device comprises a three-dimensional (3D) NAND device.

Example 19. At least one non-transitory machine-readable storage medium comprising instructions that, when executed by a processing device, cause the processing device to perform operations comprising: computing, during a power-on sequence of a memory device, a first value associated with reading data from an individual portion of the memory device; obtaining a second value associated with reading data from the individual portion, the second value having been computed during a power-off sequence of the memory device; comparing the first value with the second value to estimate a measure of slow charge loss (SCL) encountered while the memory device was powered off; and reading the data from a plurality of portions of the memory device based on respective threshold voltages that compensate for the estimated measure of SCL.

Example 20. A method comprising: computing, during a power-on sequence of a memory device, a first value associated with reading data from an individual portion of the memory device; obtaining a second value associated with reading data from the individual portion, the second value having been computed during a power-off sequence of the memory device; comparing the first value with the second value to estimate a measure of slow charge loss (SCL) encountered while the memory device was powered off; and reading the data from a plurality of portions of the memory device based on respective threshold voltages that compensate for the estimated measure of SCL.

"Slow charge loss (SCL)" refers to charge retention loss or data retention loss that occurs in flash memory cells over time. SCL refers to the gradual leakage of electrical charge from the floating gate of a NAND cell, which can lead to data corruption or loss if left unchecked. This SCL is a natural aging process in flash memory and becomes more pronounced as the memory cells undergo more program/erase cycles and as the manufacturing process shrinks to smaller geometries. The rate of charge loss can be affected by factors such as temperature, the quality of the insulating oxide layer, and the overall design of the memory cell.

"CFBit" refers to a count of a total quantity of '1's that are stored or represented by an individual read level of a portion, such as a memory block, of the memory device. The CFBit count can be cumulative such that read levels associated with higher read voltages have a higher CFBit count than read levels associated with lower read voltages. Namely, the memory device can generate a total CFBit count and divide that total CFBit count by the total number of read levels that can be used to stored data in the memory device. A first CFBit count can be obtained by reading a quantity of '1's (or alternatively '0's) stored at a first read level and a second CFBit count can be obtained by reading a quantity of '1's (or alternatively '0's) stored at a second read level (which can be adjacent to the first read level). The second read level can be associated with a higher voltage than the first read level and, as a result, the CFBit count of the second read level includes the first CFBit count (e.g., the CFBit count of the first read level) and the CFBit count of the second read level. These CFBit counts can be used to determine a CoV and identify, based on the CoV, a read level for reading data from a given level of the memory device.

"BFEA" refers to a sophisticated technique used to enhance the reliability and performance of NAND-based storage devices, particularly in solid-state drives (SSDs). BFEA (block family error avoidance) involves grouping or categorizing blocks with similar error characteristics to optimize error management strategies. In NAND flash memory, blocks can develop varying error rates over time due to factors such as wear, manufacturing variations, and environmental conditions. The block family error avoidance bin strategy addresses this by monitoring and analyzing the error rates of individual blocks, then grouping blocks with similar error profiles into "families" or "bins." Once categorized, specific error management techniques are applied to each bin based on its unique error characteristics. This approach allows the memory controller to optimize error correction code (ECC) strategies, adjust read voltage thresholds more effectively, implement targeted wear-leveling algorithms, and prioritize blocks for garbage collection or retirement based on their error bin.

The term "coupled with" generally refers to a connection between components, which can be an indirect communicative connection or direct communicative connection (e.g., without intervening components), whether wired or wireless, including connections such as electrical, optical, magnetic, and the like.

"System data" hereinafter refers to data that is created and/or maintained by the memory sub-system for performing operations in response to host requests and for media management.

"User data" hereinafter generally refers to host data and garbage collection data.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (such as a non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, examples of the disclosure have been described with reference to specific examples thereof. It will be evident that various modifications can be made thereto without departing from the broader scope of examples of the disclosure as set forth in the following claims. The specification and drawings are, accordingly, to be regarded in an illustrative sense rather than a restrictive sense.

The invention claimed is:

1. A system comprising:
a memory device; and
a processing device, operatively coupled to the memory device, configured to perform operations comprising:
computing, during a power-on sequence of the memory device, a first value associated with reading data from an individual portion of the memory device;
obtaining a second value associated with reading data from the individual portion, the second value having been computed during a power-off sequence of the memory device;
comparing the first value with the second value to estimate a measure of slow charge loss (SCL) encountered while the memory device was powered off; and
reading the data from a plurality of portions of the memory device based on respective threshold voltages that compensate for the estimated measure of SCL, the data read from the plurality of portions of the memory device based on respective threshold voltages that compensate for the estimated measure of SCL until a specified condition is satisfied.

2. The system of claim 1, wherein the first value comprises a first voltage read offset level, and wherein the second value comprises a second voltage read offset level.

3. The system of claim 2, wherein the power-on sequence is performed at a later time than the power-off sequence, wherein the individual portion comprises multiple memory dies of the memory device.

4. The system of claim 3, the operations comprising:
computing the second value in response to receiving a command to power off the memory device; and
storing the computed second value in non-volatile memory in response to receiving the command to power off the memory device in association with data that identifies the individual portion and a block family error avoidance bin of the individual portion.

5. The system of claim 4, the operations comprising:
identifying, as the individual portion, a last written block stripe (BS) that was read from the memory device prior to receiving the command to power off the memory device.

6. The system of claim 4, the operations comprising:
identifying, as the individual portion, a specified block stripe (BS) that represents a plurality of memory blocks.

7. The system of claim 4, the operations comprising:
in response to receiving the command to power off the memory device, obtaining a hard decode pass read level associated with reading data from the individual portion of the memory device, wherein the hard decode pass read level is stored as the computed second value.

8. The system of claim 7, the operations comprising:
receiving a command to power on the memory device;
in response to receiving the command to power on the memory device, computing a new hard decode pass read level associated with reading data from the individual portion; and
measuring a read offset shift between the new hard decode pass read level associated with reading data from the individual portion and the hard decode pass read level that was stored as the computed second value.

9. The system of claim 8, the operations comprising:
sampling mandatory word lines to compute the new hard decode pass read level.

10. The system of claim 8, the operations comprising:
searching an SCL measurement table based on the read offset shift to estimate the measure of SCL, the SCL measurement table associating different block family error avoidance bins and respective read offset shift values with respective SCL measurements.

11. The system of claim 10, the operations comprising:
comparing the estimated measure of SCL with a threshold value; and
in response to determining that the estimated measure of SCL transgresses the threshold value, applying an SCL compensation value to the respective threshold voltages used to read data from the plurality of portions of the memory device.

12. The system of claim 11, the operations comprising:
determining a first threshold voltage for reading data from one of the plurality of portions based on one or more of a block family error avoidance bin associated with the one of the plurality of portions, a word line group of the one of the plurality of portions, and a corrective read result associated with the one of the plurality of portions; and
adjusting the first threshold voltage by the SCL compensation value.

13. The system of claim 11, the operations comprising:
storing a SCL compensation table that associates different estimated measures of SCL with different compensation values, the SCL compensation table being generated based on a memory device type of the memory device; and
retrieving the SCL compensation value by searching the SCL compensation table based on the estimated measure of SCL.

14. The system of claim 1, the operations comprising:

computing a trigger rate representing how frequently error handling is applied to one or more codewords (CW) read from the memory device;

comparing the trigger rate to a threshold trigger rate to determine whether the specified condition is satisfied; and in response to determining that the trigger rate transgresses the threshold trigger rate, reading the data from the plurality of portions of the memory device based on the respective threshold voltages without compensating for the estimated measure of SCL.

15. The system of claim 1, wherein the first value comprises a first CFbit count value, and wherein the second value comprises a second CFbit count value, each of the first and second CFbit count values representing a count of a total quantity of '1's that are stored or represented by an individual read level.

16. The system of claim 15, the operations comprising:

receiving a command to power on the memory device;

in response to receiving the command to power on the memory device, computing the second CFbit count value associated with the individual portion;

measuring a read offset shift between the first CFbit count value and the second CFbit count value;

searching an SCL measurement table based on the read offset shift to estimate the measure of SCL; and in response to determining that the estimated measure of SCL transgresses the threshold value, applying an SCL compensation value to the respective threshold voltages used to read data from the plurality of portions of the memory device.

17. The system of claim 1, wherein the memory device comprises a three-dimensional (3D) NAND device.

18. At least one non-transitory machine-readable storage medium comprising instructions that, when executed by a processing device, cause the processing device to perform operations comprising:

computing, during a power-on sequence of a memory device, a first value associated with reading data from an individual portion of the memory device;

obtaining a second value associated with reading data from the individual portion, the second value having been computed during a power-off sequence of the memory device;

comparing the first value with the second value to estimate a measure of slow charge loss (SCL) encountered while the memory device was powered off; and reading the data from a plurality of portions of the memory device based on respective threshold voltages that compensate for the estimated measure of SCL, the data read from the plurality of portions of the memory device based on respective threshold voltages that compensate for the estimated measure of SCL until a specified condition is satisfied.

19. A method comprising:

computing, during a power-on sequence of a memory device, a first value associated with reading data from an individual portion of the memory device;

obtaining a second value associated with reading data from the individual portion, the second value having been computed during a power-off sequence of the memory device;

comparing the first value with the second value to estimate a measure of slow charge loss (SCL) encountered while the memory device was powered off; and reading the data from a plurality of portions of the memory device based on respective threshold voltages that compensate for the estimated measure of SCL, the data read from the plurality of portions of the memory device based on respective threshold voltages that compensate for the estimated measure of SCL until a specified condition is satisfied.

20. The method of claim 19, wherein the first value comprises a first voltage read offset level, and wherein the second value comprises a second voltage read offset level.

* * * * *